United States Patent [19]

Hayashi et al.

[11] Patent Number: 4,731,669

[45] Date of Patent: Mar. 15, 1988

[54] CAMERA APPARATUS WITH MOVABLY SUPPORTED LENS BARREL

[75] Inventors: Takayuki Hayashi, Hirakata; Jirou Kajino, Neyagawa, both of Japan

[73] Assignee: Matsushita Electric Industrial Co., Ltd., Osaka, Japan

[21] Appl. No.: 870,963

[22] Filed: Jun. 5, 1986

[30] Foreign Application Priority Data

| Jun. 18, 1985 | [JP] | Japan | 60-132294 |
| Jun. 24, 1985 | [JP] | Japan | 60-137258 |
| Jul. 18, 1985 | [JP] | Japan | 60-159023 |
| Jul. 18, 1985 | [JP] | Japan | 60-159024 |
| Oct. 16, 1985 | [JP] | Japan | 60-230149 |
| Dec. 9, 1985 | [JP] | Japan | 60-276338 |

[51] Int. Cl.$^4$ .................. H04N 5/247; H04N 5/225
[52] U.S. Cl. .................................. 358/229
[58] Field of Search .............. 358/229, 909; 354/288 R; 352/242, 243

[56] References Cited

U.S. PATENT DOCUMENTS

| 3,518,372 | 6/1970 | Johns | 178/6.8 |
| 3,577,205 | 5/1971 | Hobrough | 250/213 |
| 4,008,372 | 12/1977 | Veno et al. | 358/229 |
| 4,233,634 | 11/1980 | Adams | 358/229 |
| 4,404,595 | 9/1983 | Ushiro et al. | 358/227 |
| 4,408,860 | 10/1983 | Barzee | 352/243 |
| 4,531,159 | 7/1985 | Takubo et al. | 358/229 |

FOREIGN PATENT DOCUMENTS 53-64175  11/1976  Japan .

*Primary Examiner*—Jin F. Ng
*Assistant Examiner*—Stephen Brinich
*Attorney, Agent, or Firm*—Wenderoth, Lind & Ponack

[57] ABSTRACT

A camera apparatus having a image fluctuation suppressing function has a fixed body and a lens barrel. The lens barrel is supported rotatably in at least one of panning and tilting directions by a supporting frame. The lens barrel is rotated by a panning or tilting actuator for suppressing an image fluctuation due to a fluctuation of the fixed body. The apparatus has a lock mechanism for locking the lens barrel so as not to rotate. The apparatus preferably has a mechanism for compensating for a movement of center of gravity of the lens barrel due to focusing or zooming operation.

14 Claims, 6 Drawing Figures

CAMERA APPARATUS WITH MOVABLY SUPPORTED LENS BARREL

BACKGROUND OF THE INVENTION

1. Field of the Invention

The Present invention relates to a camera apparatus which converts an optical image of a moving object into video signals which will be reconverted to visible screen images, and more particularly to a camera apparatus which is free from undesired fluctuations of the produced images when it is subjected to undesired movements.

2. Description of the Prior Art

Recently, portable video cameras have become widely used with the spread of video tape recorders (VTRs). The developments of the video cameras have been directed to automatic operation and adjustment. In this respect, the latest video cameras are provided with such functions as auto-focus, auto-iris and auto-white balance to ease handling by an operator.

Undesired movements, or fluctuations, of the camera will take place when the camera is installed on aircraft, robots, cars, moving vehicles and the like, or hand-operated by an operator. Usually, users of an ordinary camera do not wish to use a troublesome tripod or heavy vibration stabilizing apparatus. Therefore, the operator at present must pay close attention to holding one's hand very still for avoiding involuntary movements of the camera, which makes the operator tired soon or results in an unsatisfactory image quality for the images the operator took. Under these circumstances, a video camera capable of getting a stable and good quality image without any image fluctuations has been demanded.

An image fluctuation prevention device is disclosed in Japanese Laid-Open Patent Application No. 53-64175. This device uses a gyroscope which rotates at a high speed. Thus, it is large in size and heavy in weight, and therefore is not readily portable. Further, when the image fluctuation prevention function is released by stopping the gyroscope, the camera cannot be supported stably, which causes difficulty in shooting.

SUMMARY OF THE INVENTION

It is an object of the present invention to provide a low-cost, light-weight and small-size camera apparatus capable of automatically suppressing image fluctuation so that an operator can easily operate the camera apparatus to take successive video images which are stable and good in quality.

A camera apparatus according to the present invention comprises a lens system for shooting an object, a photo-electric conversion means for converting an optical image of the object through the lens system into electric signals, holding means for holding the lens system and the photo-electric conversion means, supporting means for supporting the holding means rotatably in at least one of panning and tilting directions, drive means for driving the holding means to move in at least one of the panning and tilting directions, and control means for controlling the drive means.

Since the apparatus of the invention does not use the bulky and heavy gyroscope, it can be made small and light and at a low cost. This enables an operator to easily take a good quality imge without image fluctuations by hand-operation even on cars, aircraft and the life.

The camera apparatus of the invention may preferably further comprise lock means for locking the holding means. The locking means may be operated either manually or automatically.

The camera apparatus of the invention may preferably further comprise means for compensating for movement of the center of gravity of the holding means due to focusing or zooming operation, thereby to achieve a more effective image fluctuation suppressing control.

The above and other features and advantages of the invention will be apparant from the following description of some preferred embodiments taken together with the accompanying drawings in which:

DESCRIPTION OF THE PREFERRED EMBODIMENTS

Figure 1:
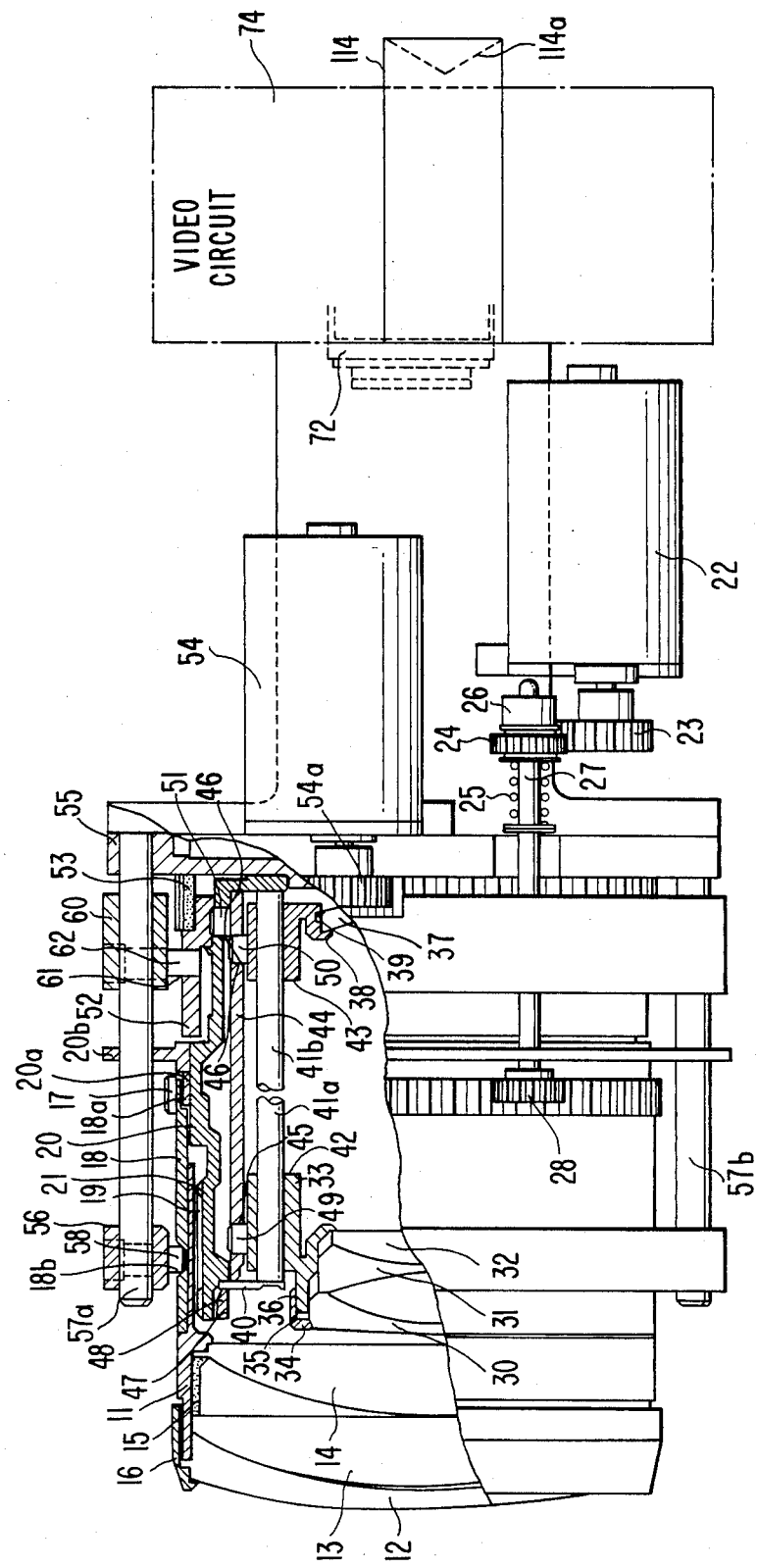
FIG. 1 is a partially-sectional side view of a lens barrel used in an embodiment of camera apparatus according to the invention.
Figure 2:
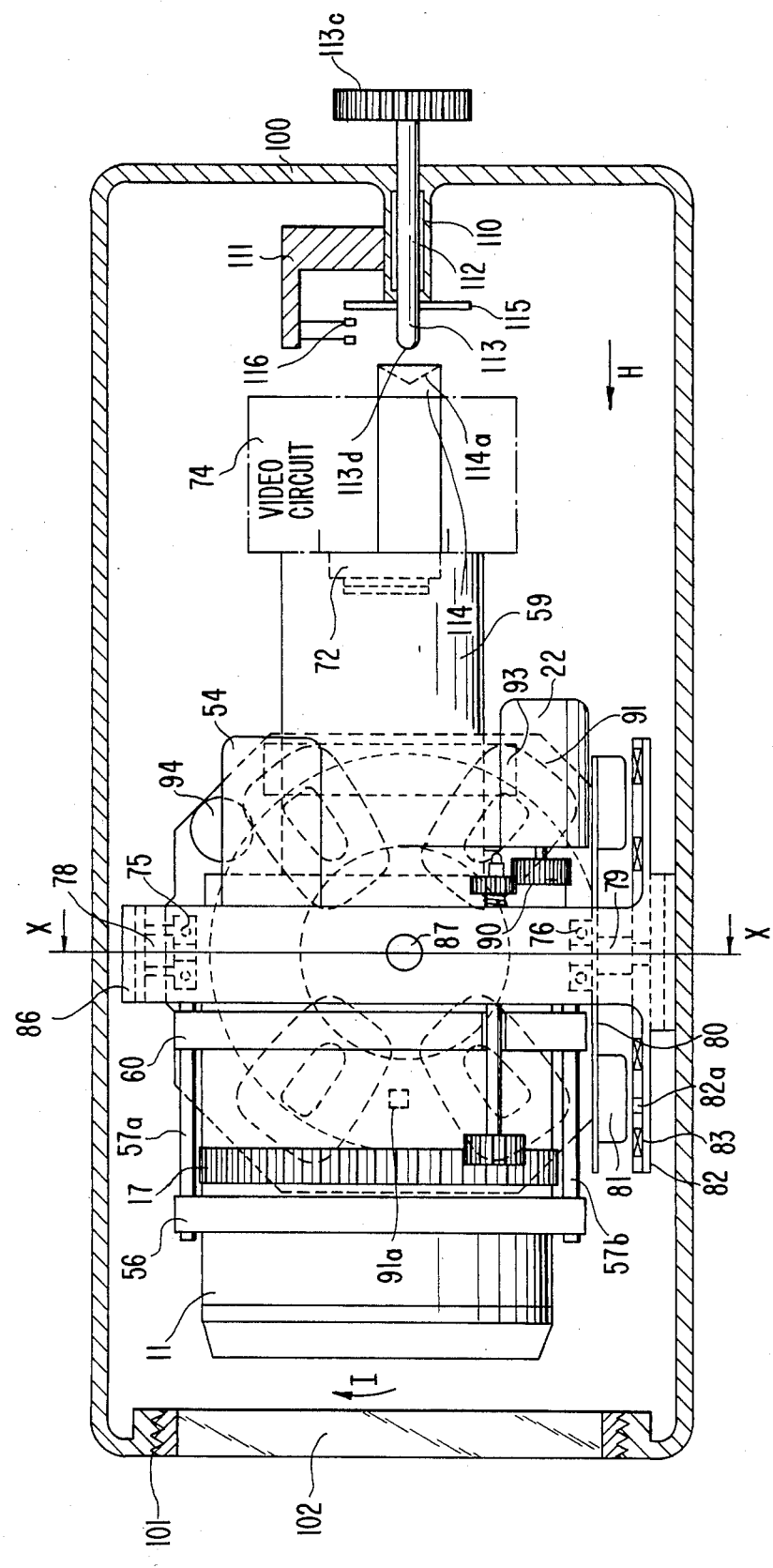
FIG. 2 is a partially-sectional side view of the camera apparatus using the lens barrel shown in FIG. 1.

First, an embodiment of the invention will be described with reference to FIGS. 1 and 2. FIG. 1 shows a lens barrel used in the embodiment, and FIG. 2 shows the camera apparatus of the embodiment.

Referring to FIG. 1, focus lenses 12, 13 and 14 are held at their edges to an inner surface of a focus ring 11, and fixed by a lens fixing ring 16 fixed to the front edge of the focus ring 11. The focus lenses 13 and 14 are spaced apart from each other at a regular interval by a lens spacer 15. The focus ring 11 is fixed at its rear portion in a focus gear ring 18 having at its rear end a focus gear 17. A helicoidal screw thread 19 provided on the inner surface of the focus ring 11 is engaged with a helicoidal screw thread 21 provided on a fixed barrel 20, so that a rotation of the focus ring 11 or the focus gear ring 18 about the optical axis of the lens barrel 59 causes a movement of the focus lenses 12, 13 and 14 in the optical axis direction.

A focus motor 22 is rotated by operating a focus operation switch (not shown). The rotation of the focus motor 22 is transmitted to a gear 28 through a gear 23 mounted on the motor shaft, a friction mechanism constituted by an idler gear 24, a friction spring 25 and a friction adjustment ring 26, and a focus shaft 27. The rotation of the gear 28 is transmitted to the focus gear 17 engaged therewith, so that the focus gear ring 18 and the focus ring 11 fixed thereto are rotated about the optical axis to move the focus lenses 12, 13 and 14 in the optical axis direction.

Excessive movement (projection) of the focus lenses 12, 13 and 14 is limited by a notch 18a provided at the rear end of the focus gear ring 18 and a stopper 20a provided on the fixed barrel 20 for engaging in the notch 18a.

Zoom lenses 30, 31 and 32 are held in a first lens holder 33 and fixed by a fixing ring 34 engaging the zoom lens 30 and engaging at a screw-threaded portion portion 35 with a screw thread 36 provided on the first lens holder 33. A corrector lens 37 is inserted into a second lens holder 38 and fixed by a fixing spring 39 urging the corrector lens 37 into the second lens holder 38.

Guide rods 41a and 41b fixed to the fixed barrel 20 and a rod supporting plate 40 are respectively inserted into slots 42 and 43 which are respectively provided in the first and second lens holders 33 and 38 so that the first and second lens holders 33 and 38 are slidable along the guide rods 41a and 41b, respectively, in the optical axis direction. The rod supporting plate 40 is fixed to the fixed barrel 20 by a rod supporting annular screw 47 engaged with to a screw thread 48 provided on the fixed barrel 20.

Cam pins 49 and 50 which are respectively fixed to the first and second lens holders 33 and 38 are inserted into first and second cam grooves 45 and 46 provided in a cam barrel 44 so as to move the first and second lens holders 33 and 38 to regulate the positions of the zoom lenses 30, 31 and 32 and the corrector lens 37, respectively, on the optical axis. A cam pin 51 fixed to the cam barrel 44 is inserted into a groove (not shown) provided on an inner surface of a zoom ring 52. A zoom gear 53 is rotatably mounted on the zoom ring 52 for rotation about the optical axis.

In case of zooming, a zoom operation switch (not shown) is turned on to activate a zoom motor 54. The rotation of the zoom motor 54 is transmitted rotate the zoom ring 52 through a gear 54a mounted on the shaft of the motor 54 and the zoom gear 53 engaged with the gear 54a. The rotation of the zoom ring 52 causes rotation of the cam barrel 44 via the engagement of the cam pin 51 with the groove on the zoom ring 52. The rotation of the cam barrel 44 is converted to a zooming operation, or linear movements along the optical axis, of the zoom lenses 30–32 and the corrector lens 37 via the respective engagements of the cam pin 49 with the cam groove 45 and of the cam pin 50 with the cam groove 46.

In case of focusing, the focus operation switch is turned on to activate the focus motor 22. The rotational force of the focus motor 22 drives the focus gear 17 to rotate the focus ring 11 thereby to move the focus lenses 12–14 in the optical axis direction.

The center of gravity of the lens barrel will, unless corrective measures are taken, be moved due to the movement of the focus lenses 12–14 or the movements of the zoom lenses 30–32 and the corrector lens 37. To avoid the movement of the center of gravity of the lens barrel due to the movement of the focus lenses 12–14, a ring-shaped first weight 56 is slidably mounted on a pair of guide shafts 57a and 57b which are fixed to a supporting frame 55. Due to the ring shape, the center of gravity of the first weight 56 is generally on the optical axis of the lens barrel regardless of the position of the lens barrel. The first weight 56 has a third guide pin 58 inserted into a third cam groove 18b provided on the focus gear ring 18 so as to be moved by the rotation of the focus gear ring 18 in a direction opposite to the moving direction of the focus lenses 12–14, thereby to avoid the movement of the center of gravity of the lens barrel due to the movement of the focus lenses 12–14.

To avoid the movement of the center of gravity of the lens barrel due to the movements of the zoom lenses 30–32 and the corrector lens 37, a ring-shaped second weight 60 is slidably mounted on the pair of guide shafts 57a and 57b. Due to the ring shape, the center of gravity of the second weight 60 is generally on the optical axis of the lens barrel regardless of the position of the lens barrel. The second weight has a fourth guide pin 62 inserted into a fourth cam groove 61 provided onthe zoom ring 52 so as to be moved by the rotation of the zoom ring 52 in a direction opposite to the moving direction of the zoom lenses 30–32, thereby to avoid the movement of the center of gravity of the lens barrel due to the movements of the zoom lenses 30–32 and the corrector lens 37.

The pair of guide shafts 57a and 57b are supported at the respective centers of the lengths thereof by a supporting ring 20b mounted on the fixed barrel 20 so as not to be deformed, or bent, due to the weights of the first and second weights 56 and 60, thereby to allow the first and second weights to be smoothly guided along the guide shafts 57a and 57b.

Other lenses such as a fixed lens (not shown) and a master lens (not shown) are also mounted in the lens barrel. A photoelectric conversion means comprised of an image pickup device 72, such as a CCD placed behind the lens barrel, which converts an optical image of an object to electric signals, and a video circuit 74 which processes the electric signals from the image pickup device 72 to produce a predetermined video signal such as a television signal. The fixed barrel 20 and lens barrel 59 together comprise holding means for the lens system and the photoelectric conversion means.

Figure 3:
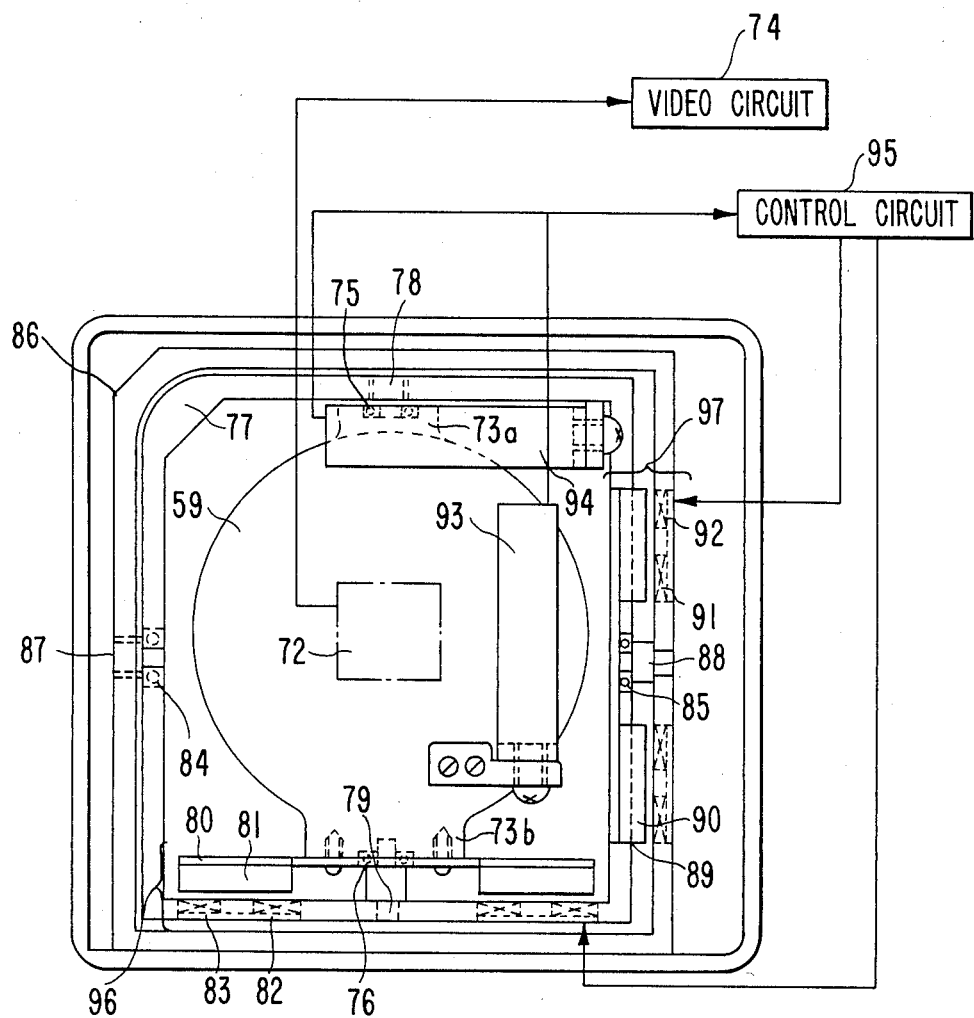
FIG. 3 is a sectional view along a line X—X in FIG. 2.

Referring next to FIGS. 2 and 3, an overall structure of a camera apparatus of an embodiment of the invention will be described. FIG. 2 is a side view of the camera apparatus, in which a cabinet 100 is shown as sectional, and FIG. 3 is a sectional view taken along a line X—X in FIG. 2.

Bearings 75 and 76 respectively pressed into upper and lower portions 73a and 73c of a lens barrel 59. The lens barrel 59 is rotatably (in panning directions) connected to a supporting means in the form of a first frame 77 by means of rotatable shafts 78 and 79 which are respectively mounted on upper and lower sides of the first frame 77 and rotatably supported by the bearings 75 and 76. Also fixed to the lower portion 73c of the lens barrel 59 is a plate 80 which is made of a magnetic material and having on a lower surface thereof a ring magnet 81. Coils 83 are in spaced opposed relation to the ring magnet 81. The coils 83 are adhered to an upper surface of a flat plate 82 which is made of a magnetic material and fixed to the first frame 87. A Hall element 82a is provided on the plate 82 in a position opposite to the ring magnet 81 for detecting the rotary position of the lens barrel 59 in a panning direction.

The first frame 77 is provided at left and right sides thereof with bearings 84 and 85 for rotatably supporting rotary shafts 87 and 88, respectively, which are mounted on left and right sides of a second frame 86 which surrounds the first frame 77 in a spaced relation and constitutes a further part of the supporting means. Therefore, the lens barrel 59 and the first frame 77 are rotatable (in tilting directions) with respect to the second frame 86. The second frame 86 is fixed to the bottom of the cabinet 100. Also fixed to the right side of the first frame 77 is a plate 89 which is made of a magnetic material and having thereon a ring magnet 90. Coils 92 are located in spaced opposed relation to the ring magnet 90. The coils 90 are adhered to a flat plate 91 which is made of a magnetic material and fixed to the second frame 86. A Hall element 91a is provided on the plate 91 in a position opposite to the ring magnet 90 for detecting a rotary position of the first frame 77 and the lens barrel 59 in a tilting direction.

The magnet 81 and the coil 83 constitute a panning actuator for rotating the lens barrel 59 in panning directions. The magnet 90 and the coil 92 constitute a tilting actuator for rotating the lens barrel 59 and the first frame 77 in tilting directions. The panning actutor further has an angular rate sensor 93 mounted on the lens barrel 59 for detecting the angular rate of movement of the lens barrel 59 in a panning direction. The tilting actuator further has an angular rate sensor 94 mounted on the first frame 77 for detecting the angular rate of movement of the lens barrel in a tilting direction.

The panning and tilting actuators are respectively driven under control of a control circuit 95 so that output signals of the angular rate sensors 93 and 94 respectively become zero. For example, when the lens barrel 59 is deviated in a tilting direction (direction I shown in FIG. 2) the control circuit 95 supplies an electric signal to the coil 92 to move the lens barrel (together with the first frame 77) in the direction opposite to the direction I so that the output signal of the angular rate sensor 94 becomes zero. With this control, an image fluctuation in a vertical direction can be suppressed. In the same manner, an image fluctuation in a horizontal direction can also be suppressed by controlling the panning actuator. Even when the lens barrel 59 is deviated in a generally diagonal directon, the panning and tilting actuators are controlled independently of each other to compensate for the respective components of the deviation in the panning and tilting directions in the same manner as above, thereby to suppress an image fluctuation in the diagonal direction.

The above-described image fluctuation suppressing control would seem to badly affect actual panning or tilting operation of the camaera apparatus by an operator. However, since relative angles in panning and tilting directions of the lens barrel 59 with respect to the cabinet 100 (or the camera body) are detected by the Hall element 82a and the magnet 81 and by the Hall element 91a and the magnet 90, respectively, the lens barrel 59 can be controlled to follow a movement of the cabinet 100 in response to a detected signal from the Hall element 82a or 91a. Accordingly, the operator can operate the camera apparatus to pan or tilt in the same way as using the conventional camera apparatus.

It is also possible to remotely control the shooting direction of the camera apparatus by providing a remote control switch (not shown), thereby to realize auto-panning and auto-tilting. Even in this case, the image fluctuation suppressing control is performed by using the output signals of the angular rate sensors and the hall elements.

The lens barrel 59 can be locked by a lock shaft 113 provided at a rear wall of the cabinet 100 and a rod 114 fixed to the lens barrel 59 at the rear end of the lens barrel 59. The lock shaft 113 is provided therealong with a male screw thread 112 meshed with a female screw thread 110 provided on the rear wall of the cabinet 100, and at an end outside the cabinet 100 with a turning nob 113c. By turning the nob 113c rightward, the lock shaft 113 is projected into the cabinet 100 (in the direction shown by an arrow H) until its round-shaped end 113d is brought into contact with a hollowed end 114a of the rod 114, by which the lens barrel 59 is locked. The lens barrel 59 is unlocked by turning the nob 113c leftward.

The lock shaft 113 further has a switch press member 115 near the round-shaped end 113d for actuating a switch 116 supported by a switch supporting member 111 mounted on the rear wall of the cabinet 100. When the lock shaft 113 locks the lens barrel 59, the switch 116 is turned on by the pressure of the switch press member 15 to cut the power supplied to the panning and tilting actuators so as to disable the image fluctuation suppressing control. In other words, the camera apparatus of the invention can be operated in the same way as the conventional camera apparatus when the lens barrel 59 is locked.

In the above embodiment, the movement of the center of gravity of the lens barrel due to focusing or zooming is compensated for by moving the weights, but it can be also compensated for by moving the rotatable supporting position of the lens barrel in cooperation with the focusing or zooming. Needless to say that the compensation of the movement of the center of gravity can be applied to a camera apparatus which does not have the zooming function.

Further, in the above embodiment, the angular rate sensors are employed to suppress the image fluctuation, but any other sensor can be used as long as it functions to detect a fluctuation of the lens barrel. For example, acceleration sensors may be employed, in which case the panning and tilting actuators are so controlled to make the output signals of the acceleration sensors to be zero. Furthermore, the image pickup device may be configured to compare image signals frame by frame and detect direction and amount of a fluctuation of an image signal, thereby to control the lens barrel to eliminate the fluctuation.

Figure 4:
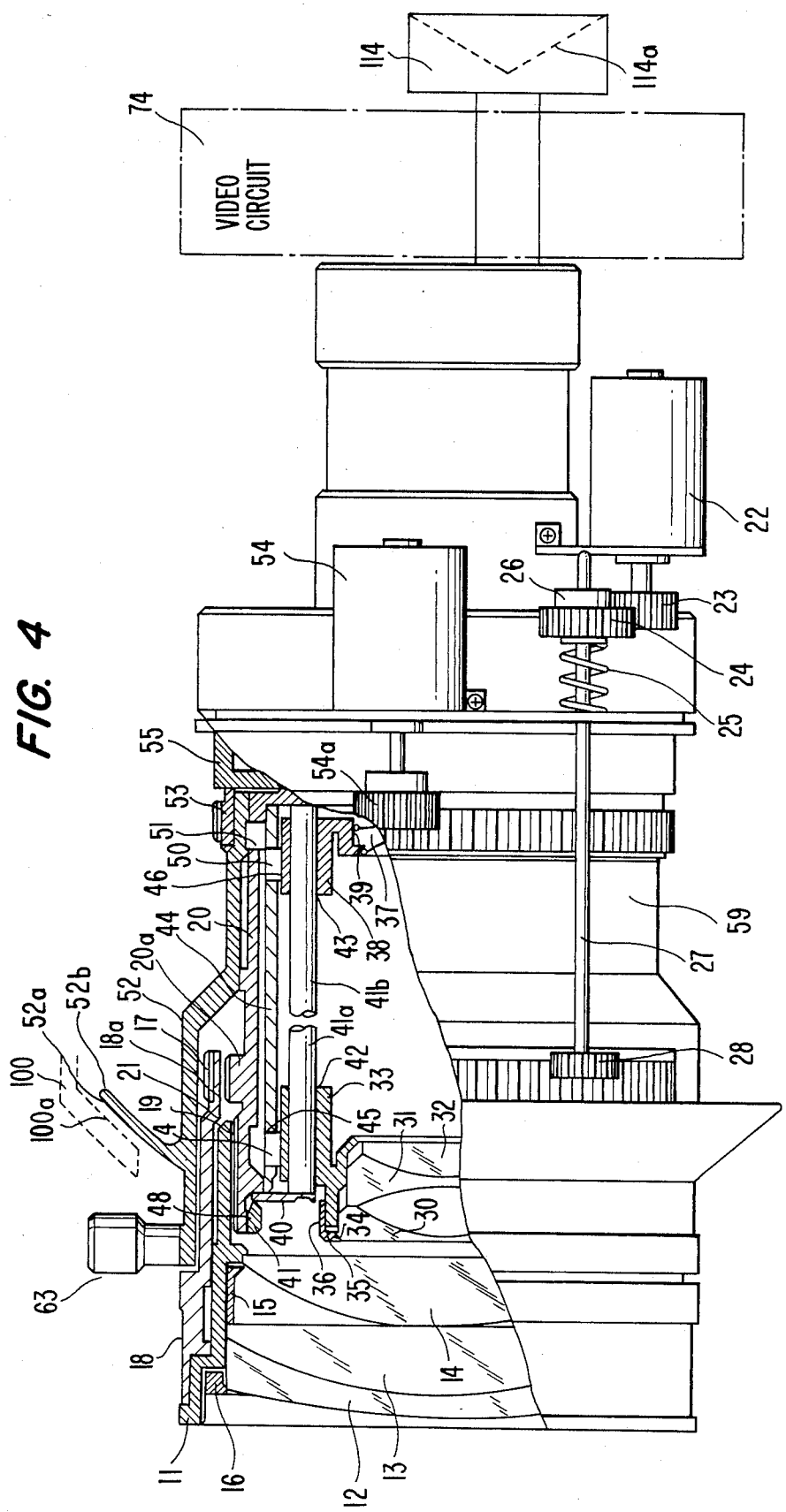
FIG. 4 is a partially-sectional side view of lens barrel used in another embodiment of camera apparatus according to the invention.
Figure 5:
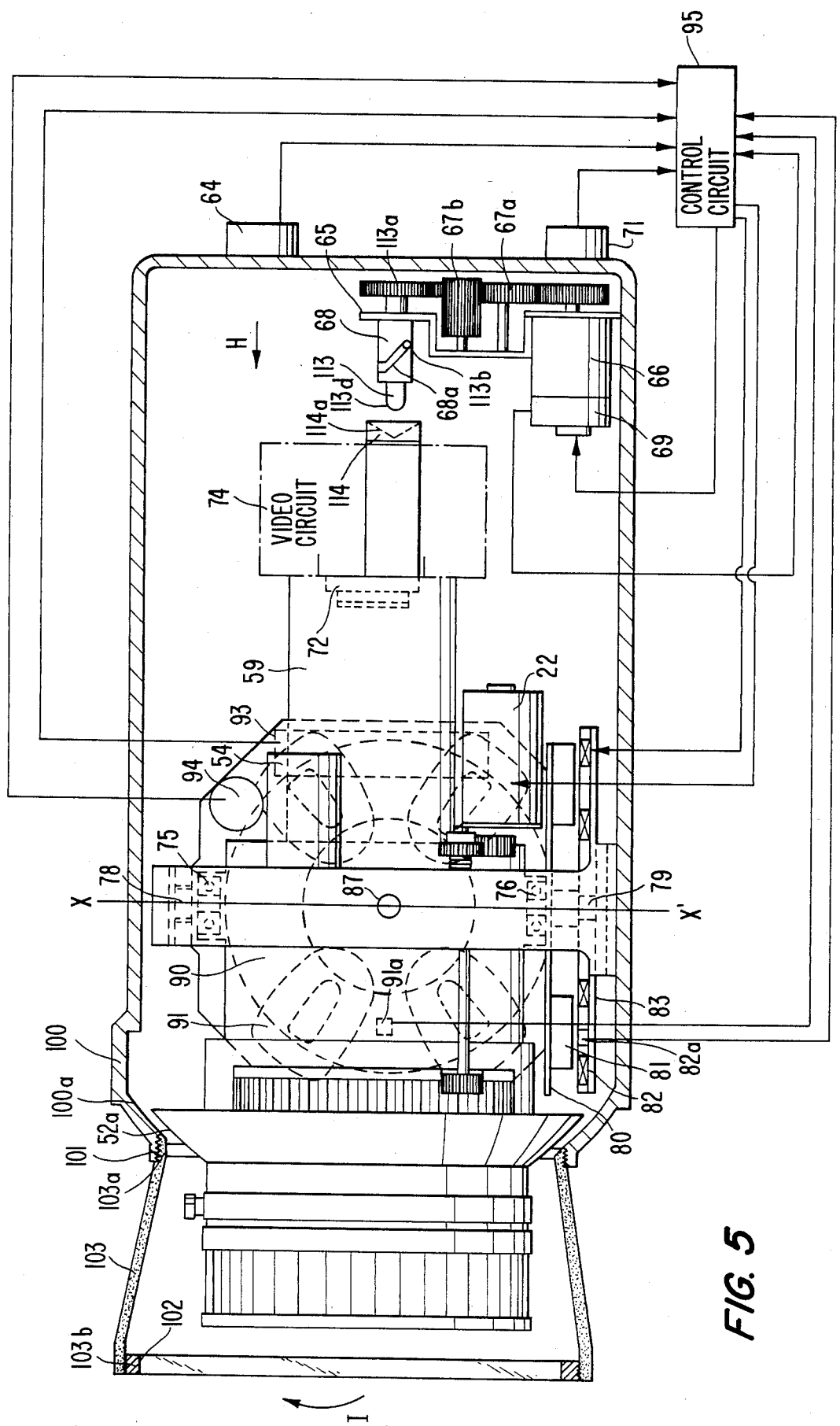
FIG. 5 is a partially-sectional side view of the camera apparatus using the lens barrel shown in FIG. 4.
Figure 6:
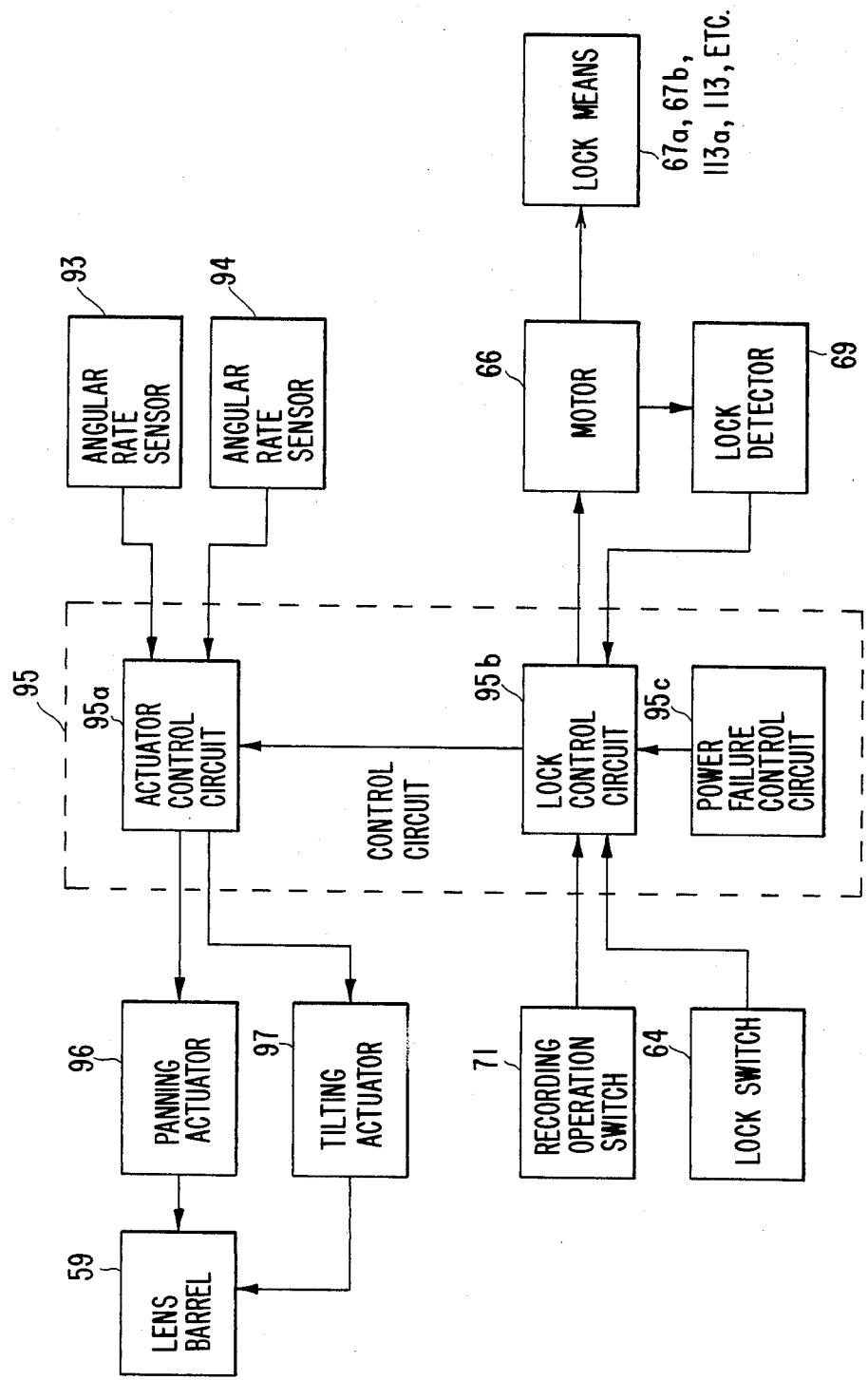
FIG. 6 is a block diagram showing electrical connections in the camera apparatus in FIG. 5.

Next, another embodiment of the invention will be described with reference to FIGS. 4, 5 and 6. The same reference numerals are used to designate like parts. FIG. 4 shows another embodiment of a lens barrel, FIG. 5 shows another embodiment of a camera apparatus using the lens barrel in FIG. 4, and FIG. 6 is a block diagram illustrating electrical connections in the camera apparatus in FIG. 5.

The zoom ring 52 is provided near the front end thereof with a rim projection 52b having a spherical surface 52a opposed to an internal spherical surface 100a of a bent front end of the cabinet 100. The radii of curvature of the spherical surfaces 52a and 100a are nearly on the center of rotation of the lens barrel 59, and the radius of curvature of the spherical surface 52a is smaller than that of the spherical surface 100a, so that the lens barrel 59, when it rotates about the rotary shafts 78 and 79 or the rotary shafts 87 and 88, will not touch the cabinet 100. Also, the inside of the cabinet 100 is invisible from the outside, and dust is prevented from entering thereinto.

The focus ring 11, a part of the focus gear ring 18, and a front part of the zoom ring 52 on which a zoom operation lever 63 is mounted are exposed out of the cabinet 100 so they can be manually operated by an operator for focusing or zooming.

The rim projection 52b may be either integral with or attached to the zoom ring 52. Further, the rim projection 52b may be provided at any other position as long as it is at a constant spacing from the cabinet 100 during focusing or zooming. For example, the rim projection 52b can be provided on the fixed barrel.

Now, a mechanism for locking the lens barrel 59 will be described. When a lock switch 64 is turned on, the control circuit 95 drives a motor 66 mounted on a lock plate 65 fixed to the cabinet 100. The rotation of the motor 66 is transmitted to a lock gear 113a mounted on the lock shaft 113 through a speed reduction mechanism composed of idler gears 67a and 67b mounted on the lock plate 65. The lock shaft 113 has a cam pin 113c inserted into a cam groove 68a provided on a support member 68 fixed to the lock plate 65 so that it is movable in the direction H with while being guided by the cam groove 68a. The round-shaped end 113d of the lock shaft 113 will engage with the hollowed end 114a of the rod 114 fixed to the lens barrel 59 thereby to lock the lens barrel 59. The hollow of the hollowed end 114a is designed such that the end 113d of the lock shaft 113 is able to touch the hollowed end 114a at any position in a rotatable range of the lens barrel 59. Therefore, at any time when the lens barrel 59 is locked, the optical axis of the lens barrel 59 is automatically positioned to coincide with the shooting axis of the camera apparatus.

It is also possible, when the lock switch 64 is turned on, to rotate the lens barrel 59 so that the optical axis coincides with the shooting axis of the camera apparatus before driving the motor 66. In this case, the size of the hollow of the hollowed end 114a can be made small.

Referring to FIG. 5, the cabinet 100 is provided at the front edge with a female screw thread 101 into which a cover 103 with its male screw 103a can be screwed to cover the exposed portion of the lens barrel 59. The cover 103 is provided at its front edge with a female screw 103c into which an accessory 102 such as a filter or a protective plate (acrylic transparent plate, for example) is screwed. Generally, an accessory such as a filter is mounted on the lens barrel. However, in the case of the camera apparatus according to the invention, mounting the accessory on the lens barrel causes a movement of the center of gravity of the lens barrel, so that the image fluctuation suppressing effect is reduced. Even if the movement of the center of gravity is electrically compensated for, it causes an increase of power consumption and affects the response speed of the camera apparatus. Further, since the lens barrel is kept stationary by the image fluctuation suppressing control when the cabinet is fluctuated, the operator would feel as if the lens barrel were fluctuating. These problems are solved by providing the cover 103 which covers the lens barrel 59 to make it invisible and untouchable from the outside, and to be free from dust. Since the accessory 102 is mounted on the cover 103, it does not affect the image fluctuation suppressing control of the lens barrel 59. Furthermore, since the cover 103 is easily detachable, it is easy to manually operate the camera apparatus by moving the focus ring 11 or the zoom lever 48 with the operator's hand after removing the cover 103. The connection between the cover 103 and the cabinet 100 or between the accessary 102 and the cover 103 is not limited to the screws, but can be achieved by any other known means.

Referring to FIG. 6, the control circuit 95 includes an actuator control circuit 95a, a lock control circuit 95b and a power failure control circuit 95c. The actuator control circuit 95a is responsive to the output signals of the angular rate sensors 93 and 94 for controlling the panning and tilting actuators 96 and 97 which drive the lens barrel 59. A lock detector 69 is provided to detect whether the lens barrel 59 is locked or not. The lock detector 69 may be a rotation detector for detecting the rotation of the motor 66 or a switch such as the switch 116 shown in FIG. 2. The lock control circuit 95b is responsive to a lock detection signal from the lock detector 69 for stopping supply of power to the motor 66. This is effective to save unnecessary power consumption. A recording operation switch 71 is provided for changing the operation mode of a recording apparatus connected with the camera apparatus into a recording mode or a pause mode. The lock control circuit 95b is responsive also to an output signal of the recording operation switch for locking the lens barrel 59 in the pause mode and unlocking it in the recording mode. The lock control circuit 95b is activated also by operating the lock switch 64.

The power failure control circuit 95c has a known power failure detector and a power storage device such as a battery or a capacitor which stores power supplied from the recording apparatus (such as VTR). When the externally supplied power fails, the power failure control circuit 95c operates to supply the power from the built-in power storage device to the motor 66 through the lock control circuit 95b to lock the lens barrel 59. Therefore, the lens barrel 59 is locked whenever a power failure occurs.

The actuator control circuit 95a is also responsive to the lock detection signal produced by the lock detector 69 and transmitted through the lock control circuit 95b for disabling the operations of the panning and tilting actuators 96 and 97 when the lens barrel 59 is locked.

What is claimed is:

1. A camera apparatus comprising:
   a lens system for receiving the optical image of an object;
   a photoelectric conversion means for converting the optical image of said object which has passed through said lens system into electric signals;
   holding means for holding said lens system and said photoelectric conversion means;
   a cabinet for encasing therein said holding means, a front part of said holding means being exposed out of said cabinet so that said lens system can receive the optical image of the object;
   supporting means encased in said cabinet for rotatably supporting said holding means in at least one of panning and tilting directions with respect to said cabinet;
   drive means for driving said holding means to move said holding means in at least one of said panning and tilting directions;
   control means for controlling said drive means; and
   lock means operable independently of said drive means for locking said holding means so as to prevent movement of said holding means relative to said cabinet.

2. The apparatus according to claim 1, further comprising lock drive means for driving said lock means for locking and unlocking, and lock control means for controlling said lock drive means.

3. The apparatus according to claim 2, wherein said lock control means includes a power failure detecting means for controlling said lock drive means to drive said lock means so as to lock said holding means when said power failure detecting means detects a power failure.

4. The apparatus according to claim 2, wherein said lock control means includes an operation switch for changing a mode of a recording apparatus connected with said camera apparatus into a recording mode or a pause mode, and for controlling said lock drive means to drive said lock means so as to lock said holding means when said operation switch changes said mode of said recording apparatus into said pause mode.

5. The apparatus according to claim 2, further comprising lock detecting means for detecting when said holding means is locked, and wherein said lock control means is responsive to a lock detection signal from said lock detecting means for stopping power supply to said lock drive means.

6. The apparatus according to claim 2, further comprising lock detecting means for detecting when said holding means is locked, wherein said control means for controlling said drive means for driving said holding means is responsive to a lock detection signal from said lock detecting means for stopping power supply to said drive means so that said drive means does not drive said holding means.

7. The apparatus according to claim 1, wherein said supporting means supports said holding means generally at the center of gravity of said holding means.

8. The apparatus according to claim 1, further comprising means for compensating for movement of the center of gravity of said holding means when a lens in said lens system is moved along an optical axis.

9. The apparatus according to claim 8, wherein said compensating means comprises a weight, and guide means for guiding said weight to move in a direction for compensating for the movement of said center of gravity due to the movement of said lens.

10. The apparatus according to claim 8, wherein said compensating means comprises a first weight movable in a direction opposite to the moving direction of a focus lens in said lens system, a second weight movable in a direction opposite to the moving direction of a zoom lens in said lens system, and guide means for guiding said first and second weights so as to compensate for the movement of said center of gravity.

11. The apparatus according to claim 1, further comprising at least one of focusing means for moving a focus lens in said lens system and zooming means for moving a zoom lens in said lens system, said at least one of focusing means and zooming means being exposed out of said cabinet.

12. The apparatus according to claim 1, wherein said holding means has a projecting member having a spherical surface and said cabinet has a complementary spherical surface provided opposite said spherical surface and defining a gap between said holding means and said cabinet which is invisible from the outside of said cabinet.

13. The apparatus according to claim 1, further comprising a cover for covering the exposed part of said holding means.

14. The apparatus according to claim 1, further comprising detecting means for detecting a movement of said holding means due to a positional deviation of said cabinet, and wherein said control means is responsive to a detection signal from said detecting means for controlling said drive means for driving said drive means for driving said holding means to move in a direction opposite to said movement due to said positional deviation of said cabinet, whereby image fluctuation of said optical image due to said deviation of said cabinet is suppressed.

* * * * *